United States Patent [19]
Ehnes

[11] Patent Number: 6,059,351
[45] Date of Patent: May 9, 2000

[54] VEHICLE CANOPY APPARATUS

[76] Inventor: Steve L. Ehnes, P.O. Box 1357, Lebanon, Mo. 65536

[21] Appl. No.: 09/199,298

[22] Filed: Nov. 24, 1998

Related U.S. Application Data

[60] Provisional application No. 60/067,407, Dec. 3, 1997.

[51] Int. Cl.[7] .................................................. B62O 25/06
[52] U.S. Cl. ......................... 296/102; 296/103; 296/104; 296/105; 135/88.01; 135/88.03
[58] Field of Search ........................... 296/102, 103–105; 135/88.01, 88.03

[56] References Cited

U.S. PATENT DOCUMENTS

| | | | |
|---|---|---|---|
| 932,339 | 8/1909 | Slipler . | |
| 2,256,890 | 9/1941 | Brown et al. | 296/102 |
| 2,631,057 | 11/1953 | Weaklend . | |
| 3,917,302 | 11/1975 | Gebhard | 296/102 |
| 4,165,097 | 8/1979 | Boudreau et al. | 296/102 |
| 4,542,915 | 9/1985 | Wheeler, III et al. | 296/102 |
| 5,022,420 | 6/1991 | Brim . | |
| 5,094,500 | 3/1992 | Maypole et al. | 296/102 |
| 5,232,005 | 8/1993 | Mitchell . | |
| 5,579,795 | 12/1996 | Colbo, Jr. . | |
| 5,743,208 | 4/1998 | Miller | 135/88.01 |
| 5,803,104 | 9/1998 | Pollen | 135/88.03 |
| 5,842,732 | 12/1998 | Daggett et al. | 296/102 |
| 5,918,613 | 7/1999 | Larson | 135/88.01 |
| 5,931,114 | 8/1999 | Bartholomew | 296/102 |

*Primary Examiner*—Joseph D. Pape
*Assistant Examiner*—Kiran Patel

[57] ABSTRACT

A canopy apparatus is provided for a vehicle and includes inner and outer canopy support assemblies which include inner and outer top transverse canopy beams. The canopy support assemblies are pivotally connected to the vehicle. A flexible sheet assembly is supported by the top transverse canopy beams. Outer rider members are in sliding engagement with the outer canopy struts. Inner rider members are in sliding engagement with the inner canopy struts, wherein each of the outer rider members is placed adjacent to one of the inner rider members. A pair of rotatable rider connector assemblies are provided, wherein each rotatable rider connector assembly is connected between an outer rider member and an adjacent inner rider member. With the vehicle canopy apparatus of the invention, when the vehicle is moving forward and the top transverse inner canopy beam bumps into a tree limb, the vehicle canopy apparatus yields to the tree limb and flexes backward. Similarly, when the vehicle is moving backward and the top transverse outer canopy beam bumps into a tree limb, the vehicle canopy apparatus yields to the tree limb and flexes forward. The yielding and flexing action of the vehicle canopy apparatus prevents encountered tree limbs from damaging either the canopy of the vehicle which supports the canopy. In either case, when the vehicle canopy apparatus is moved away from the tree limb, the bias springs aid the vehicle canopy apparatus is returned to the erected, non-flexed orientation.

11 Claims, 5 Drawing Sheets

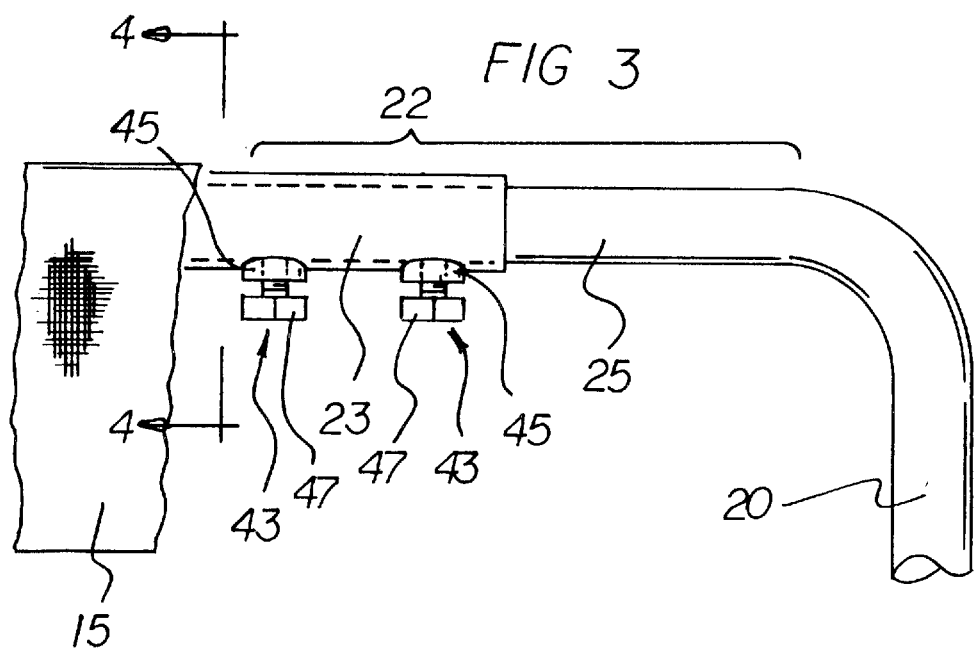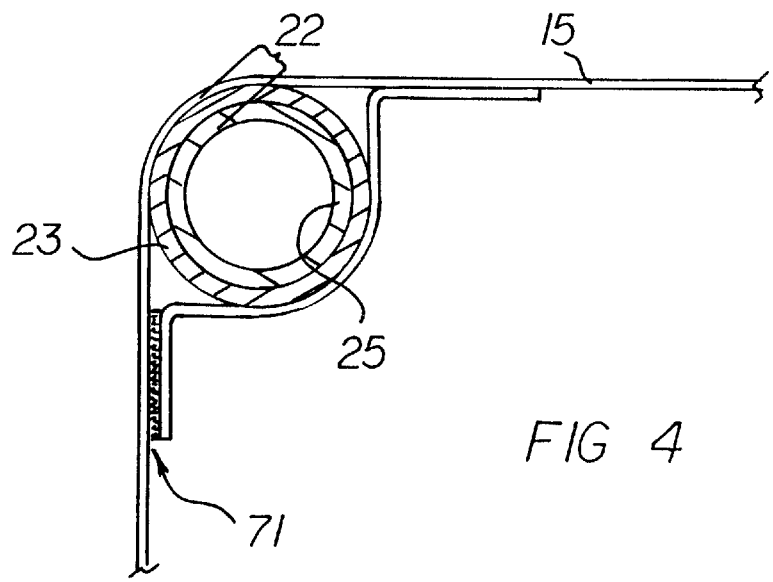

VEHICLE CANOPY APPARATUS

CROSS-REFERENCE TO RELATED APPLICATION

This application claims priority based upon my prior copending Provisional Application Ser. No. 60/067,407, filed Dec. 3, 1997.

BACKGROUND OF THE INVENTION

Field of the Invention

The present invention relates generally to canopies and, more particularly, to canopies especially adapted for protecting a user of a vehicle from sun and rain.

Description of the Prior Art

A number of small vehicles are used outdoors, and the user of such vehicles is susceptible to receiving solar radiation and rain during use. To protect the user from solar radiation and rain, such vehicles are often equipped with canopies. In this respect, throughout the years, a number of innovations have been developed relating to canopies for small vehicles, and the following U.S. patents are representative of some of those innovations: U.S. Pat. Nos. 932,339, 2,631,057, 5,022,420, 5,232,005, and 5,579,795. More specifically, each of the above-mentioned patents discloses a canopy that has a substantially rigid orientation with respect to the vehicle on which it is mounted. A problem situation often occurs that is associated with such rigidly oriented canopies. When the vehicle moves forward or backward and the canopy bumps into an overhanging tree limb, the vehicle canopy can be damaged. Moreover, the vehicle canopy can be torn from the vehicle to which it is attached. In this respect, it would be desirable if a vehicle canopy were provided that is not damaged when the canopy bumps into an overhanging tree limb when the vehicle moves forward or backward.

Still other features would be desirable in a vehicle canopy apparatus. For example, once the vehicle backs away from an overhanging tree limb so that the vehicle canopy is no longer in contact with the overhanging tree limb, the vehicle canopy can return to its normal orientation.

Because a canopy can protect a vehicle driver from an overhanging tree limb, it would be desirable if the vehicle canopy were limited in its degree of response to an overhanging tree limb. More specifically, it would not be desirable if a vehicle canopy were bent down upon a driver's head when the vehicle canopy contacts the overhanging tree limb.

A riding lawnmower is a popular small vehicle for which a vehicle canopy is especially useful. Such a canopy is especially susceptible to impacts with overhanging tree limbs. In this respect, it would be desirable if a vehicle canopy were provided that is especially useful with riding lawnmowers.

Riding lawnmowers are produced in a variety of sizes. In this respect, it would be desirable if a vehicle canopy were provided that is adjustable to a variety of sizes of riding lawnmowers.

Thus, while the foregoing body of prior art indicates it to be well known to use vehicle canopies for small vehicles, the prior art described above does not teach or suggest a vehicle canopy apparatus which has the following combination of desirable features: (1) is not damaged when the canopy bumps into an overhanging tree limb when the vehicle moves forward or backward; (2) once the vehicle drives away from an overhanging tree limb so that the vehicle canopy is no longer in contact with the overhanging tree limb, the vehicle canopy can return to its normal orientation; (3) is limited in its degree of response to an overhanging tree limb so that the canopy does not collapse on a driver's head; (4) is especially useful with riding lawnmowers; and (5) is adjustable to a variety of sizes of riding lawnmowers. The foregoing desired characteristics are provided by the unique vehicle canopy apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a canopy apparatus for a vehicle and includes an outer canopy support assembly which includes a pair of outer canopy distal ends. A pair of outer canopy struts is connected to the outer canopy distal ends, and a top transverse outer canopy beam is connected between the outer canopy struts. The outer canopy distal ends are pivotally connected to the vehicle. An inner canopy support assembly includes a pair of inner canopy distal ends. A pair of inner canopy struts is connected to the inner canopy distal ends, and a top transverse inner canopy beam is connected between the inner canopy struts. The pair of inner canopy struts are nested within the pair of outer canopy struts. The inner canopy distal ends are pivotally connected to the vehicle. A flexible sheet assembly is supported by the top transverse outer canopy beam and the top transverse inner canopy beam. A pair of outer rider members is in sliding engagement with the pair of outer canopy struts. A pair of inner rider members is in sliding engagement with the pair of inner canopy struts, wherein each of the pair of outer rider members is placed adjacent to one of the pair of inner rider members. A pair of rotatable rider connector assemblies is provided, wherein each rotatable rider connector assembly is connected between an outer rider member and an adjacent inner rider member. Each of the rotatable rider connector assemblies can include a threaded nut welded to one of the canopy struts and a threaded bolt welded to the adjacent canopy strut. When an inner rider member rotates with respect to its adjacent outer rider member, the threaded shaft of the threaded bolt rotates inside the threaded nut. A pair of bottom outer rider stops is connected to the pair of outer canopy struts. A pair of bottom inner rider stops is connected to the pair of inner canopy struts.

With the vehicle canopy apparatus of the invention, when the vehicle is moving forward and the top transverse inner canopy beam bumps into a tree limb, the vehicle canopy apparatus yields to the tree limb and flexes backward. Similarly, when the vehicle is moving backward and the top transverse outer canopy beam bumps into a tree limb, the vehicle canopy apparatus yields to the tree limb and flexes forward. The yielding and flexing action of the vehicle canopy apparatus prevents encountered tree limbs from damaging either the canopy of the vehicle which supports the canopy. In either case, when the vehicle canopy apparatus is moved away from the tree limb, the bias springs aid the vehicle canopy apparatus in returned to the erected, non-flexed orientation.

Each of the bottom outer rider stops and the bottom inner rider stops includes a stop sleeve member and a stop lock nut for locking the respective stop sleeve member on a respective canopy strut. Each of the top outer rider stops and the top inner rider stops can be in a form of a spring clip.

Each of the outer canopy struts includes a pair of first outer canopy riser portions connected to the outer canopy distal ends. A pair of transverse outer canopy width extender portions is connected to the first outer canopy riser portions, and a pair of second outer canopy riser portions is connected to the transverse outer canopy width extender portions. The top transverse outer canopy beam is connected between the second outer canopy riser portions. Each of the inner canopy struts includes a pair of first inner canopy riser portions connected to the inner canopy distal ends. A pair of transverse inner canopy width extender portions is connected to the first inner canopy riser portions, and a pair of second inner canopy riser portions is connected to the transverse inner canopy width extender portions. The top transverse inner canopy beam is connected between the second inner canopy riser portions. The pair of second inner canopy riser portions are nested within the pair of second outer canopy riser portions. The pair of outer rider members is in sliding engagement with the pair of second outer canopy riser portions. The pair of inner rider members is in sliding engagement with the pair of second inner canopy riser portions. Each of the pair of outer rider members is placed adjacent to one of the pair of inner rider members. Each of the pair of bottom outer rider stops is connected to the pair of second outer canopy riser portions. Each of the pair of bottom inner rider stops is connected to the pair of second inner canopy riser portions. A pair of top outer rider stops is connected to the pair of outer canopy struts, and a pair of top inner rider stops is connected to the pair of inner canopy struts.

A pair of bias springs is provided, wherein each bias spring is connected between a portion of one outer canopy strut and a portion of one inner canopy strut.

Each of the top transverse outer canopy beam and the top transverse inner canopy beam includes an outside telescopic portion. An inside telescopic portion is received in the outside telescopic portion, and a telescope locking assembly is supported by the outside telescopic portion for locking the outside telescopic portion and the inside telescopic portion in a preselected position. The telescope locking assembly includes a threaded lock nut supported by the outside telescopic portion and a threaded lock bolt received in the lock nut.

In addition, each of the outer canopy distal ends and the inner canopy distal ends includes a distal end adjustment assembly. Each of the distal end adjustment assemblies includes a telescopic inner connector member received in an outer distal tube portion which includes a pin-reception channel. A lock pin is provided for locking the telescopic inner connector member with respect to the outer distal tube portion. The telescopic inner connector member includes a series of adjustment channels arrayed longitudinally along the telescopic inner connector member. The adjustment channels are selected so that the top of the vehicle canopy apparatus is oriented horizontally in a non-flexed orientation.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle canopy apparatus which has all of the advantages of the prior art and none of the disadvantages.

It is another object of the present invention to provide a new and improved vehicle canopy apparatus which may be easily and efficiently manufactured and marketed.

It is a further object of the present invention to provide a new and improved vehicle canopy apparatus which is of durable and reliable construction.

An even further object of the present invention is to provide a new and improved vehicle canopy apparatus which is susceptible of a low cost of manufacture with regard to both materials and labor, and which accordingly is then susceptible of low prices of sale to the consuming public, thereby making such vehicle canopy apparatus available to the buying public.

Still yet a further object of the present invention is to provide a new and improved vehicle canopy apparatus which is not damaged when the canopy bumps into an overhanging tree limb when the vehicle moves forward or backward.

Still another object of the present invention is to provide a new and improved vehicle canopy apparatus that once the vehicle drives away from an overhanging tree limb so that the vehicle canopy is no longer in contact with the overhanging tree limb, the vehicle canopy can return to its normal orientation.

Yet another object of the present invention is to provide a new and improved vehicle canopy apparatus which is limited in its degree of response to an overhanging tree limb so that the canopy does not collapse on a driver's head.

Even another object of the present invention is to provide a new and improved vehicle canopy apparatus that is e specially useful with riding lawnmowers.

Still a further object of the present invention is to provide a new and improved vehicle canopy apparatus which is adjustable to a variety of sizes of riding lawnmowers.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged, partially broken away view, of the portion of the embodiment of the vehicle canopy apparatus of FIG. 2 contained in circled region 3 thereof.

FIG. 4 is an enlarged cross-sectional view of the portion of the embodiment of the invention shown in FIG. 3 taken along line 4—4 thereof.

DESCRIPTION OF THE PREFERRED EMBODIMENT

Figure 1:
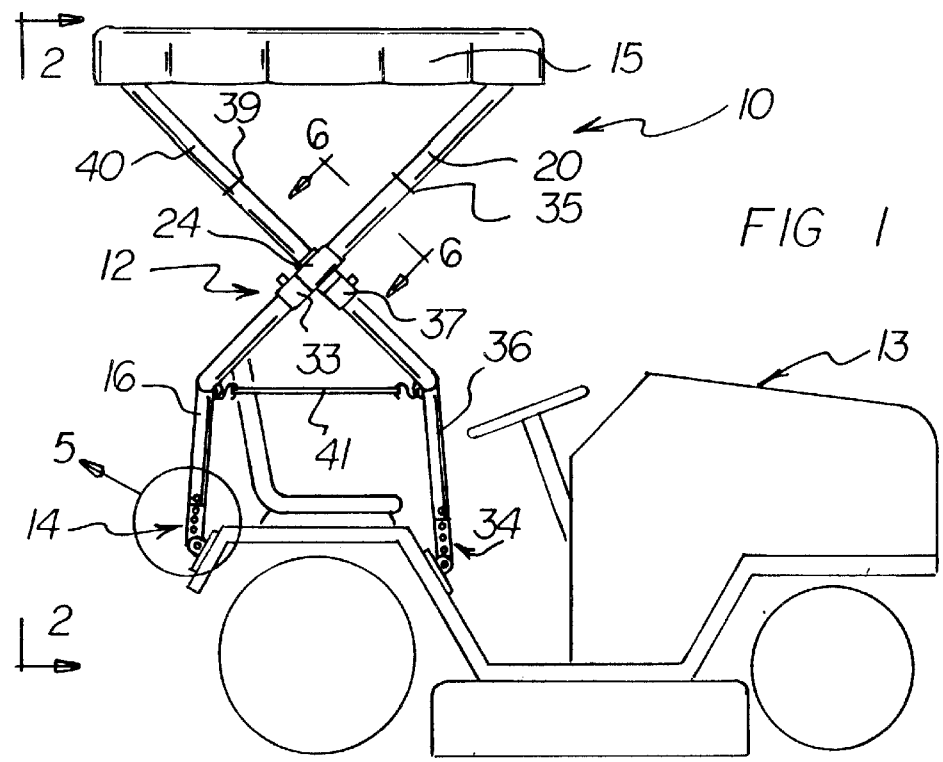
FIG. 1 is a side view showing a preferred embodiment of the vehicle canopy apparatus of the invention mounted on a riding lawn mower, wherein the vehicle canopy apparatus is in a non-flexed mode.
Figure 2:
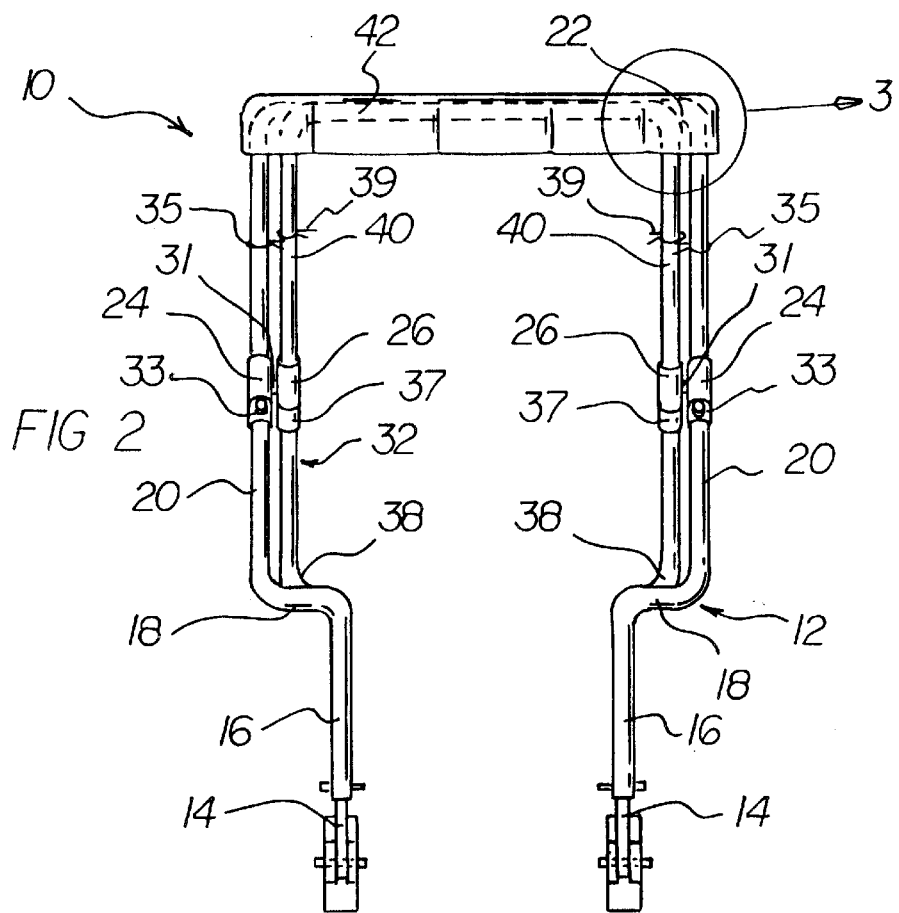
FIG. 2 is an enlarged rear view of the embodiment of the vehicle canopy apparatus shown in FIG. 1 taken along line 2—2 of FIG. 1.
Figure 5:
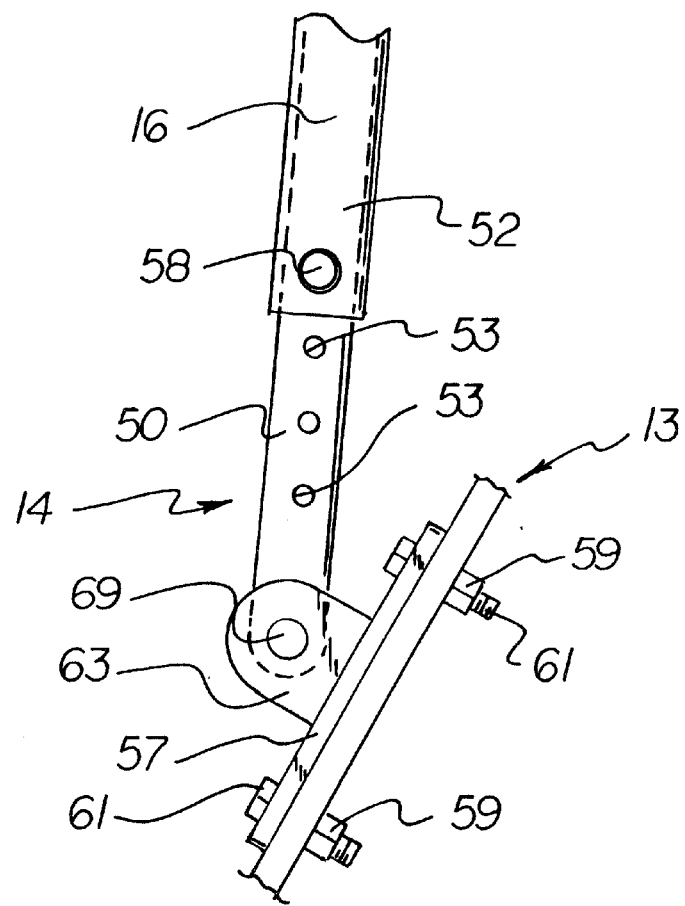
FIG. 5 is an enlarged side view of the portion of the embodiment of the invention shown in FIG. 1 contained within circled region 5 thereof
Figure 6:
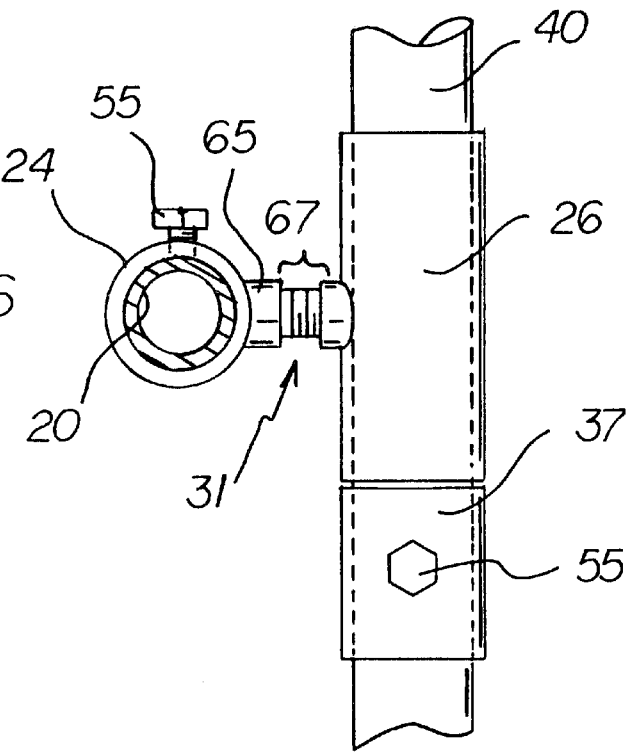
FIG. 6 is an enlarged cross-sectional view of the embodiment of the invention shown in FIG. 1 taken along line 6—6 thereof.

With reference to the drawings, a new and improved vehicle canopy apparatus embodying the principles and concepts of the present invention will be described.

Turning to FIGS. 1–8, there is shown an exemplary embodiment of the vehicle canopy apparatus of the invention generally designated by reference numeral 10. In its preferred form, vehicle canopy apparatus 10 is provided for a vehicle 13 and includes an outer canopy support assembly 12 which includes a pair of outer canopy distal ends 14. A pair of outer canopy struts is connected to the outer canopy distal ends 14, and a top transverse outer canopy beam 22 is connected between the outer canopy struts. The outer canopy distal ends 14 are pivotally connected to the vehicle 13. An inner canopy support assembly 32 includes a pair of inner canopy distal ends 34. A pair of inner canopy struts is connected to the inner canopy distal ends 34, and a top transverse inner canopy beam 42 is connected between the inner canopy struts. The pair of inner canopy struts are nested within the pair of outer canopy struts. The inner canopy distal ends 34 are pivotally connected to the vehicle 13. A flexible sheet assembly 15 is supported by the top transverse outer canopy beam 22 and the top transverse inner canopy beam 42. A pair of outer rider members 24 is in sliding engagement with the pair of outer canopy struts. A pair of inner rider members 26 is in sliding engagement with the pair of inner canopy struts, wherein each of the pair of outer rider members 24 is placed adjacent to one of the pair of inner rider members 26. A pair of rotatable rider connector assemblies 31 is provided, wherein each rotatable rider connector assembly 31 is connected between an outer rider member 24 and an adjacent inner rider member 26. Each of the rotatable rider connector assemblies 31 can include a threaded nut 65 welded to one of the canopy struts and a threaded bolt 67 welded to the adjacent canopy strut. When an inner rider member 26 rotates with respect to its adjacent outer rider member 24, the threaded shaft of the threaded bolt 67 rotates inside the threaded nut 65. A pair of bottom outer rider stops 33 is connected to the pair of outer canopy struts. A pair of bottom inner rider stops 37 is connected to the pair of inner canopy struts.

With the vehicle canopy apparatus 10 of the invention, when the vehicle 13 is moving forward and the top transverse inner canopy beam 42 bumps into a tree limb, the vehicle canopy apparatus 10 yields to the tree limb and flexes backward. Similarly, when the vehicle 13 is moving backward and the top transverse outer canopy beam 22 bumps into a tree limb, the vehicle canopy apparatus 10 yields to the tree limb and flexes forward. The yielding and flexing action of the vehicle canopy apparatus 10 prevents encountered tree limbs from damaging either the canopy of the vehicle which supports the canopy. In either case, when the vehicle canopy apparatus 10 is moved away from the tree limb, the bias springs 41 aid the vehicle canopy apparatus 10 in returned to the erected, non-flexed orientation.

Each of the bottom outer rider stops 33 and the bottom inner rider stops 37 includes a stop sleeve member and a stop lock nut 55 for locking the respective stop sleeve member on a respective canopy strut. Each of the top outer rider stops 35 and the top inner rider stops 39 can be in a form of a spring clip.

Each of the outer canopy struts includes a pair of first outer canopy riser portions 16 connected to the outer canopy distal ends 14. A pair of transverse outer canopy width extender portions 18 is connected to the first outer canopy riser portions 16, and a pair of second outer canopy riser portions 20 is connected to the transverse outer canopy width extender portions 18. The top transverse outer canopy beam 22 is connected between the second outer canopy riser portions 20. Each of the inner canopy struts includes a pair of first inner canopy riser portions 36 connected to the inner canopy distal ends 34. A pair of transverse inner canopy width extender portions 38 is connected to the first inner canopy riser portions 36, and a pair of second inner canopy riser portions 40 is connected to the transverse inner canopy width extender portions 38. The top transverse inner canopy beam 42 is connected between the second inner canopy riser portions 40. The pair of second inner canopy riser portions 40 are nested within the pair of second outer canopy riser portions 20. The pair of outer rider members 24 is in sliding engagement with the pair of second outer canopy riser portions 20. The pair of inner rider members 26 is in sliding engagement with the pair of second inner canopy riser portions 40. Each of the pair of outer rider members 24 is placed adjacent to one of the pair of inner rider members 26. Each of the pair of bottom outer rider stops 33 is connected to the pair of second outer canopy riser portions 20. Each of the pair of bottom inner rider stops 37 is connected to the pair of second inner canopy riser portions 40. A pair of top outer rider stops 35 is connected to the pair of outer canopy struts, and a pair of top inner rider stops 39 is connected to the pair of inner canopy struts. Each of the pair of top outer rider stops 35 is connected to the pair of second outer canopy riser portions 20. Each of the pair of top inner rider stops 39 is connected to the pair of second inner canopy riser portions 40.

A pair of bias springs 41 is provided, wherein each bias spring 41 is connected between a portion of one outer canopy strut and a portion of one inner canopy strut. More specifically, each bias spring 41 is connected between a first outer canopy riser portion 16 and a first inner canopy riser portions 36. The bias springs 41 can be in a variety of forms which includes metal springs, bungee cords, and rubber strips, among others.

Each of the top transverse outer canopy beam 22 and the top transverse inner canopy beam 42 includes an outside telescopic portion 23. An inside telescopic portion 25 is received in the outside telescopic portion 23, and a telescope locking assembly 43 is supported by the outside telescopic portion 23 for locking the outside telescopic portion 23 and the inside telescopic portion 25 in a preselected position. The telescope locking assembly 43 includes a threaded lock nut 45 supported by the outside telescopic portion 23 and a threaded lock bolt 47 received in the lock nut 45. An access orifice is provided in the outside telescopic portion 23 to permit the lock bolt 47 to contact the inside telescopic portion 25 to lock the inside telescopic portion 25 and the outside telescopic portion 23 together. The outside telescopic portions 23 and the inside telescopic portions 25 are adjusted relative to one another to accommodate vehicles of differing widths.

In addition, each of the outer canopy distal ends 14 and the inner canopy distal ends 34 includes a distal end adjustment assembly. Each of the distal end adjustment assemblies includes a telescopic inner connector member 50 received in an outer distal tube portion 52 which includes a pin-reception channel. A lock pin 58 is provided for locking the telescopic inner connector member 50 with respect to the outer distal tube portion 52. The telescopic inner connector member 50 includes a series of adjustment channels 53 arrayed longitudinally along the telescopic inner connector member 50. The adjustment channels 53 are selected so that the top of the vehicle canopy apparatus 10 is oriented horizontally in a non-flexed orientation.

For connecting a respective canopy distal end to the vehicle 13, a base plate 57 can be attached to a portion of the vehicle 13 using nuts 59 and bolts 61. The base plate 57 includes an upwardly projecting first pivot member 63 which includes a pin reception channel. The distal end of the telescopic inner connector member 50 also includes a pin reception channel. When the pin reception channels of the first pivot member 63 and the telescopic inner connector member 50 are placed in registration, a pivot pin 69 is passed through the pin reception channels. In this way, the outer canopy struts and the inner canopy struts are pivotally connected to the vehicle 13. As shown in the drawings, the vehicle 13 can be riding lawn mower.

The flexible sheet assembly 15 of the vehicle canopy apparatus 10 can be attached to the top transverse outer canopy beam 22 and the top transverse inner canopy beam 42 in a number of ways. For example, the well known VELCRO(™) material 71 can be used. Alternatively, snaps can be used.

Figure 7:
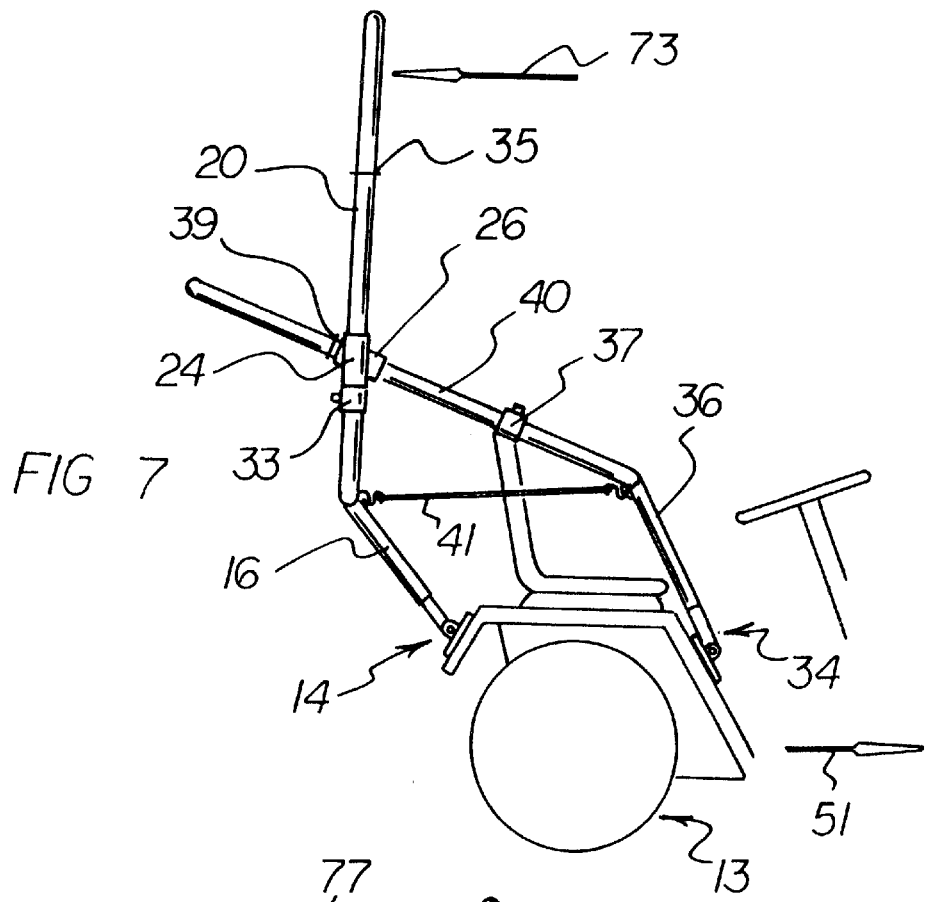
FIG. 7 is a side view of the embodiment of the invention in FIG. 1, with the flexible sheet covering removed, shown in a backwardly yielding flexed mode.

Referring to FIG. 7, with the vehicle canopy apparatus 10 of the invention, when the vehicle 13 moves forward, shown by direction arrow 51, and a tree limb bumps into the top transverse outer canopy beam 22, the top transverse outer canopy beam 22 is pushed backward, shown by direction arrow 73. When this occurs, the inner rider members 26 ride toward the top inner rider stops 39 along the second inner canopy riser portions 40, and the outer rider members 24 ride toward the bottom outer rider stops 33 along the second outer canopy riser portions 20. The extent of riding of the outer rider members 24 along the second outer canopy riser portions 20 is determined by placement of the bottom outer rider stops 33 along the second outer canopy riser portions 20. If a greater collapse of the vehicle canopy apparatus 10 is desired in the backward direction, the bottom outer rider stops 33 are adjusted toward the outer canopy distal ends 14. If a lesser collapse of the vehicle canopy apparatus 10 is desired in the backward direction, the bottom outer rider stops 33 are adjusted away from the outer canopy distal ends 14. Also, when the vehicle 13 is moving forward in direction 51 as described above, the first outer canopy riser portions 16 pivot backward around the outer canopy distal ends 14, and the first inner canopy riser portions 36 pivot backward around the inner canopy distal ends 34. When the above-described action takes place, the vehicle canopy apparatus 10 collapses backward, away from the above-described tree limb. Once the vehicle 13 reverses direction and moves away from the tree limb, the bias springs 41 help the vehicle canopy apparatus 10 to return to the erect, non-flexed orientation shown in FIGS. 1 and 2.

Figure 8:
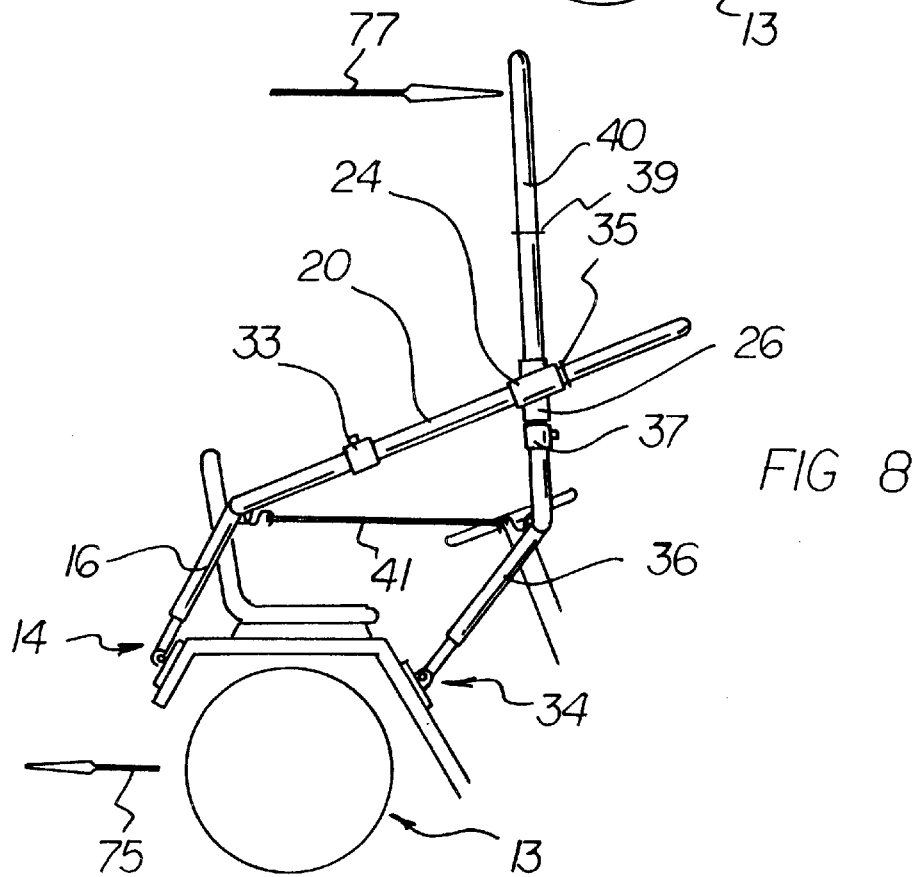
FIG. 8 is a side view of the embodiment of the invention in FIG. 1, with the flexible sheet covering removed, shown in a forwardly yielding flexed mode.

In contrast, referring to FIG. 8, when the vehicle 13 moves backward, as show by direction arrow 75, and a tree limb bumps into the top transverse inner canopy beam 42, the top transverse inner canopy beam 42 is pushed forward as shown by direction arrow 77. When this occurs, the inner rider members 26 ride toward the bottom inner rider stops 37 along the second inner canopy riser portions 40, and the outer rider members 24 ride toward the top outer rider stops 35 along the second outer canopy riser portions 20. The extent of riding of the inner rider members 26 along the second inner canopy riser portions 40 is determined by the placement of the bottom inner rider stops 37 along the second inner canopy riser portions 40. If a greater collapse of the vehicle canopy apparatus 10 is desired in the forward direction, the bottom inner rider stops 37 are adjusted toward the inner canopy distal ends 34. If a lesser collapse of the vehicle canopy apparatus 10 is desired in the forward direction, the bottom inner rider stops 37 are adjusted away from the inner canopy distal ends 34. Also, when the vehicle 13 is moving backward in direction 75 as described above, the first outer canopy riser portions 16 pivot forward around the outer canopy distal ends 14, and the first inner canopy riser portions 36 pivot forward around the inner canopy distal ends 34. When the above-described action takes place, the vehicle canopy apparatus 10 collapses forward, away from the above-described tree limb. Once the vehicle 13 reverses direction and moves away from the tree limb, the bias springs 41 help the vehicle canopy apparatus 10 to return to the erect, non-flexed orientation shown in FIGS. 1 and 2.

Figure 10:
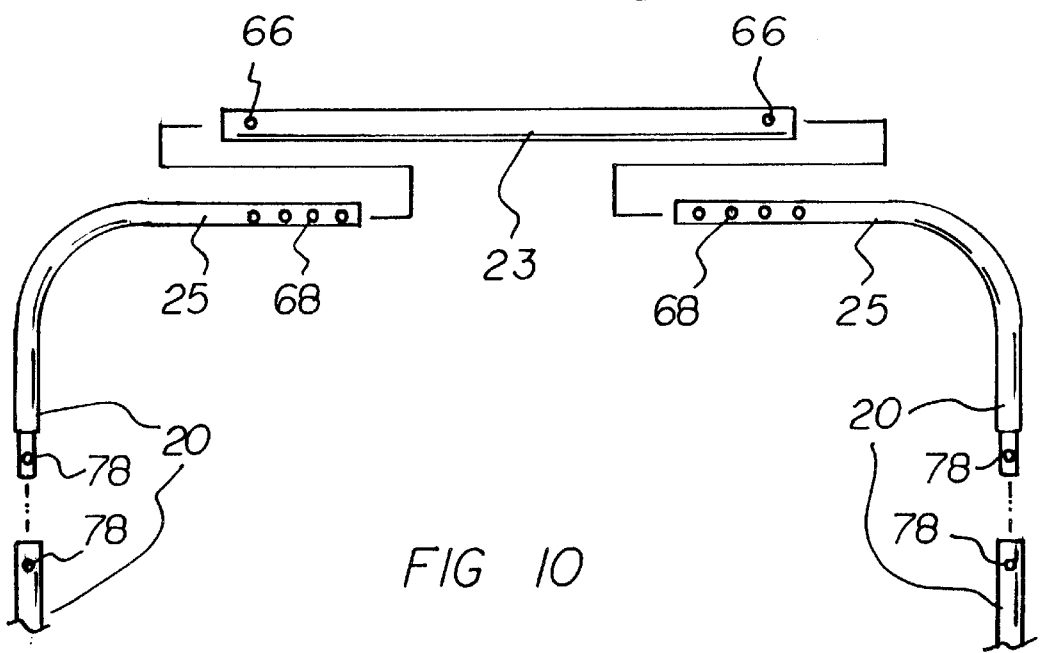
FIG. 10 illustrates an alternative embodiment of the outside telescopic portion and the inside telescopic portions shown in FIG. 3.

As shown in FIG. 10, each of the outside telescopic portions 23 includes a plurality of adjustment channels 66 located at end portions of the respective outside telescopic portions 23. Also, each of the inside telescopic portions 25 includes a plurality of selectable adjustment channels 68 located longitudinally along the respective inside telescopic portions 25. When adjustment channels 66 are placed in registration with adjustment channels 68, a lock bolt is used to secure the outside telescopic portion 23 and th e inside telescopic portion 25 together in a selected overall length. The lock bolt 47 can be in a form of a threaded wing-headed bolt.

Also, as shown in FIG. 10, the second outer canopy riser portions 20 (and also the second inner canopy riser portions 40) are in two parts that can be disassembled when the vehicle canopy apparatus is not in use. Apertures 78 in each portion of the respective canopy riser portion are placed in registration, and an attachment bolt (not shown) is used to fasten the two portions together.

Figure 9:
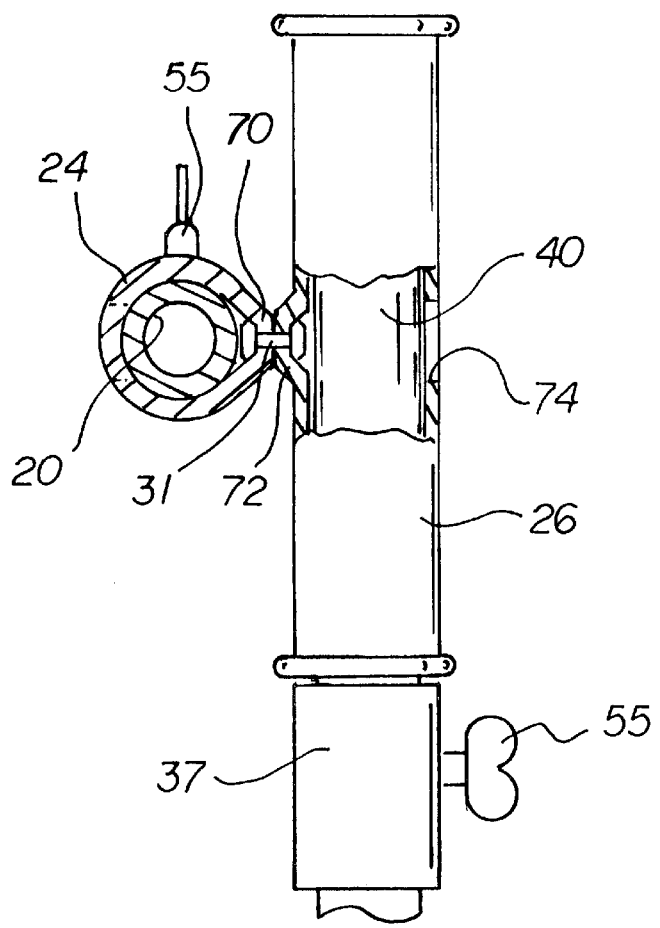
FIG. 9 is a similar view, such as shown in FIG. 6, but showing an alternate embodiment of the outer rider members and the inner rider members.

As shown in FIG. 9, each of outer rider members 24 includes an outer rider dimple 70, and each of the inner rider members 26 includes a complimentary inner rider dimple 72. Each of the inner rider members 26 includes a rotatable connector access aperture 74 for installing the rotatable rider connector assembly 31 between one of the outer rider members 24 and one of the inner rider members 26. As shown in FIG. 9, the rotatable rider connector assemblies 31 can be rivets.

The components of the vehicle canopy apparatus of the invention can be made from inexpensive and durable metal, plastic, and cloth materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle canopy apparatus that is low in cost, relatively simple in design and operation, and which may advantageously be used without being damaged when the canopy bumps into an overhanging tree limb when the vehicle moves forward or backward. With the invention, a vehicle canopy apparatus is provided which, once the vehicle drives away from an overhanging tree limb so that the vehicle canopy is no longer in contact with the overhanging tree limb, the vehicle canopy can return to its normal orientation. With the invention, a vehicle canopy apparatus is provided which is limited in its degree of response to an overhanging tree limb so that the canopy does not collapse on a driver's head. With the invention, a vehicle canopy apparatus is provided which is especially useful with riding lawnmowers. With the invention, a vehicle canopy apparatus is provided which is adjustable to a variety of sizes of riding lawnmowers.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A canopy apparatus for a vehicle, comprising:

an outer canopy support assembly which includes a pair of outer canopy distal ends, a pair of outer canopy struts connected to said outer canopy distal ends, and a top transverse outer canopy beam connected between said outer canopy struts, wherein said outer canopy distal ends are pivotally connected to the vehicle, an inner canopy support assembly which includes a pair of inner canopy distal ends, a pair of inner canopy struts connected to said inner canopy distal ends, and a top transverse inner canopy beam connected between said inner canopy struts, wherein said pair of inner canopy struts are nested within said pair of outer canopy struts, wherein said inner canopy distal ends are pivotally connected to the vehicle, a flexible sheet assembly supported by said top transverse outer canopy beam and said top transverse inner canopy beam, a pair of outer rider members in sliding engagement with said pair of outer canopy struts, a pair of inner rider members in sliding engagement with said pair of inner canopy struts, wherein each of said pair of outer rider members is placed adjacent to one of said pair of inner rider members, a pair of rotatable rider connector assemblies, wherein each rotatable rider connector assembly is connected between an outer rider member and an adjacent inner rider member, a pair of bottom outer rider stops connected to said pair of outer canopy struts, and a pair of bottom inner rider stops connected to said pair of inner canopy struts.

2. The apparatus of claim 1 wherein each of said bottom outer rider stops and said bottom inner rider stops includes:

a stop sleeve member, and a stop lock nut for locking said respective stop sleeve member on a respective canopy strut.

3. The apparatus of claim 1 wherein each of said top outer rider stops and said top inner rider stops can be in a form of a spring clip.

4. The apparatus of claim 1 wherein:

each of said outer canopy struts includes a pair of first outer canopy riser portions connected to said outer canopy distal ends, a pair of transverse outer canopy width extender portions connected to said first outer canopy riser portions, and a pair of second outer canopy riser portions connected to said transverse outer canopy width extender portions, wherein said top transverse outer canopy beam is connected between said second outer canopy riser portions, each of said inner canopy struts includes a pair of first inner canopy riser portions connected to said inner canopy distal ends, a pair of transverse inner canopy width extender portions connected to said first inner canopy riser portions, and a pair of second inner canopy riser portions connected to said transverse inner canopy width extender portions, wherein said top transverse inner canopy beam is connected between said second inner canopy riser portions, wherein said pair of second inner canopy riser portions are nested within said pair of second outer canopy riser portions, said pair of outer rider members are in sliding engagement with said pair of second outer canopy riser portions, said pair of inner rider members are in sliding engagement with said pair of second inner canopy riser portions, each of said pair of outer rider members is placed adjacent to one of said pair of inner rider members, each of said pair of bottom outer rider stops is connected to said pair of second outer canopy riser portions, each of said pair of bottom inner rider stops is connected to said pair of second inner canopy riser portions.

5. The apparatus of claim 4, further including:

a pair of top outer rider stops connected to said pair of outer canopy struts, and a pair of top inner rider stops connected to said pair of inner canopy struts.

6. The apparatus of claim 1, further including:

a pair of bias springs, wherein each bias spring is connected between a portion of one outer canopy strut and a portion of one inner canopy strut.

7. The apparatus of claim 1 wherein each of said top transverse outer canopy beams and each of said top transverse inner canopy beams includes:

an outside telescopic portion, an inside telescopic portion received in said outside telescopic portion, and a telescope locking assembly supported by said outside telescopic portion for locking said outside telescopic portion and said inside telescopic portion in a preselected position.

8. The apparatus of claim 7 wherein said telescope locking assembly includes a threaded lock nut supported by said outside telescopic portion and a threaded lock bolt received in said lock nut.

9. The apparatus of claim 1 wherein each of said outer canopy distal ends and said inner canopy distal ends includes a distal end adjustment assembly.

10. The apparatus of claim 9 wherein each of said distal end adjustment assemblies includes:

a telescopic inner connector member received in an outer distal tube portion, outer distal tube portion which includes a pin-reception channel, and a lock pin for locking said telescopic inner connector member with respect to said outer distal tube portion.

11. The apparatus of claim 10 wherein said telescopic inner connector member includes a series of adjustment channels arrayed longitudinally along said telescopic inner connector member.

* * * * *